(12) United States Patent
Brosow

(10) Patent No.: US 6,918,535 B1
(45) Date of Patent: Jul. 19, 2005

(54) SECURITY PAPER, METHOD AND DEVICE FOR CHECKING THE AUTHENTICITY OF DOCUMENTS RECORDED THEREON

(75) Inventor: Joergen Brosow, San Marcos, CA (US)

(73) Assignee: Infineon Technologies AG, München (DE)

( * ) Notice: Subject to any disclaimer, the term of this patent is extended or adjusted under 35 U.S.C. 154(b) by 0 days.

(21) Appl. No.: 09/744,610

(22) PCT Filed: Jul. 27, 1999

(86) PCT No.: PCT/EP99/05390

§ 371 (c)(1),
(2), (4) Date: Mar. 26, 2001

(87) PCT Pub. No.: WO00/07151

PCT Pub. Date: Feb. 10, 2000

(30) Foreign Application Priority Data

Jul. 27, 1998 (DE) .......................................... 198 33 746
Oct. 28, 1998 (DE) .......................................... 198 49 762

(51) Int. Cl.[7] .............................................. G06F 17/60
(52) U.S. Cl. .......................... 235/379; 235/492; 283/57
(58) Field of Search ................................ 235/375, 379, 235/380, 492, 487; 283/57, 58, 59, 82, 72, 83; 340/572.8, 5.86; 250/556

(56) References Cited

U.S. PATENT DOCUMENTS

| | | | | |
|---|---|---|---|---|
| 4,472,627 A | | 9/1984 | Weinberger | |
| 4,980,569 A | * | 12/1990 | Crane et al. | 250/556 |
| 5,112,050 A | * | 5/1992 | Koza et al. | 463/17 |
| 5,535,871 A | * | 7/1996 | Harbaugh | 194/206 |
| 5,599,046 A | * | 2/1997 | Behm et al. | 283/83 |
| 5,979,941 A | * | 11/1999 | Mosher et al. | 283/67 |
| 5,984,190 A | * | 11/1999 | Nevill | 235/492 |
| 6,039,249 A | * | 3/2000 | Szewczykowski | 235/379 |
| 6,111,506 A | * | 8/2000 | Yap et al. | 340/572.1 |
| 6,255,948 B1 | * | 7/2001 | Wolpert et al. | 340/572.8 |

FOREIGN PATENT DOCUMENTS

| | | |
|---|---|---|
| DE | 2905441 | 5/1981 |
| DE | 196 01 358 A1 | 7/1996 |
| DE | 196 30 648 A1 | 2/1998 |
| EP | 0019191 | 11/1980 |
| EP | 0905657 A1 * | 3/1999 |
| GB | 2272861 | 6/1994 |

OTHER PUBLICATIONS

Currency With an Integrated Chip, Oct. 1, 1989, IBM Technical Disclosure Bulletin, vol. 32, Issue No. 5A, p. 427.*

* cited by examiner

Primary Examiner—Ahshik Kim
(74) Attorney, Agent, or Firm—Friedrich Kueffner

(57) ABSTRACT

A safety paper with an embedded electronic circuit (1, 4, 7) is used to create more effective forgery-proof securities such as bank notes. In order to check authenticity, a carrier-frequency signal is transmitted to the circuit and an output signal representing an authenticating feature is emitted from raid circuit in response to said input signal and detected.

16 Claims, 4 Drawing Sheets

SECURITY PAPER, METHOD AND DEVICE FOR CHECKING THE AUTHENTICITY OF DOCUMENTS RECORDED THEREON

BACKGROUND OF THE INVENTION

1. Field of the Invention

The invention relates to a safety paper having a structure making possible a contactless checking of an authenticity feature and to a method for checking the authenticity of documents which are recorded in an optically readable form on the safety paper.

2. Description of the Related Art

The use of such safety papers for producing documents serves for protecting them against unauthorized reproduction by forgers. This is necessary, in particular, for securities such as bank notes, checks, travelers checks, stocks, etc. There is also a need for securing papers which do not have a direct monetary value, such as identification papers, passports etc., against unauthorized copying. The employed term "document" is therefore meant to include all types of securities and identification papers to be protected against unauthorized copying.

In particular, in the case of securities which are circulated daily, for example, bank notes, a forger may succeed in copying the optically recorded document contents, for example, the optical printed image of the bank notes, in a deceptively precise way. A protection against this is the authenticity feature contained in the safety paper, used for producing the documents, as a result of the structure imparted to the safety paper during manufacture which authenticity feature supposedly practically cannot be copied by a forger with the means available to him. Moreover, the application of watermarks or the introduction of a safety thread into the paper is known. In particular, it is known (DE 29 05 441 C3) to introduce into the paper layer a magnetizable or electrically conducting safety strip. These conventional measures, however, can no longer be considered satisfactory in view of the advances of the working means employed by forgers. In particular, in the case of global political crisis regions the war-conducting groups or even entire countries employ forgery as warfare. Accordingly, the resources employed for forgery are correspondingly great.

In a bank note produced from a known safety paper of the aforementioned kind (DE 196 30 648 A1), a transponder chip with an antenna is integrated into the bank note in a way similar to that of safety strips of different kinds integrated into conventional bank notes. The pattern which serves as the antenna has the shape of an antenna coil which is formed as a thick or thin layer structure directly on the transponder chip. As an alternative, the transponder chip can be localized in the neighborhood of the metal safety strip or at an interrupted portion of the metal safety strip and can be surrounded by the antenna coil. According to a further possibility, the metal safety strip is modified such that it forms itself the antenna coil for the transponder chip. The attachment of the antenna coil on the transponder chip itself results in a very small coil cross-section with correspondingly small sending and receiving sensitivity. Moreover, it is difficult with regard to manufacturing technology to anchor the small transponder chip on the bank note. The other aforementioned options, in which the antenna coil is arranged outside of the transponder chip on the bank note, provide the possibility of forming greater coil cross-section but the formation and connection of the antenna coil to the transponder chip on the bank note is problematic with regard to manufacturing technology.

SUMMARY OF THE INVENTION

It is an object of the invention to provide a safety paper of the aforementioned kind with improved forgery-proof properties and verification as well as a method and a device for automatic checking of the authenticity of the documents produced on the safety paper.

According to the invention, this object is solved with respect to the safety paper in that the structure is an electronic circuit which emits an output signal representing the authenticity feature in response to a received input signal.

According to the inventive embodiment of the safety paper, the checking with regard to the presence of the authenticity feature is carried out in that an input signal, which triggers emitting an output signal, is transmitted to the circuit extending within the paper plane. Preferably, the input signal as well as the output signal are in the form of a carrier frequency oscillation modulated with the corresponding signal information, respectively. With a corresponding configuration of the circuit any desired information contents, preferably in binary form, can be encoded in the output signal as an authenticity feature. It is possible to provide the electronic circuit with a micro controller. By doing so, it is possible to assign at least one individual authenticity feature, for example, the individual serial number of the micro controller, to any document produced on the safety paper. For example, in the case of a bank note, this can reside in that the authenticity feature represents in encoded form the monetary value and/or the serial number of the bank note provided on the optically readable printed image of the bank note. In a method for checking authenticity, the optically readable contents of the document, in the exemplary embodiment the monetary value of the bank note and/or its serial number, and the output signal of the circuit encoding the contents can be automatically detected and compared with one another. The authenticity of the document, for example, the bank note, is confirmed by this method only when between the optically read contents and the information contents of the output signal of the circuit a predetermined correlation, for example, content identity, is present.

A method and a document according to embodiments of the invention particularly take into account that especially bank notes can be separated into two parts and the respectively missing part can be replaced by forgery. By providing a generally invisible authenticity feature, which can however be detected by technical means, for example, magnetically or by light not within the visible range, in one part and by storing information corresponding to this authenticity feature in the circuit on the other part, the two parts are coupled to one another in a forgery-proof way. The information contents corresponding to the detected authenticity feature is entered into the circuit during the authenticity check and is checked therein with regard to authenticity, for example, by comparison to reference information. The circuit only provides the output signal acknowledging authenticity when this authenticity check is positive.

An expedient embodiment of the inventive concept is that the structure forming the circuit comprises a read-only storage having a predetermined information contents, wherein the information contents can be transmitted with the emitted output signal. In this connection, the information contents corresponding to the authenticity feature is permanently pre-set in the read-only storage and is transmitted with the emitted output signal.

In the context of the invention it is also provided that the structure forming the circuit comprises a write/read storage into which the information contents transmitted by the received input signal can be written, wherein the transmitted information contents can be transmitted with the emitted output signal.

In this embodiment, the input signal not only serves to access the fixedly adjusted authenticity feature which is permanently correlated with the document produced on the safety paper; moreover, the information contents can be transmitted to the circuit with the input signal and can be stored therein and, in response to a subsequently received receiving signal, can also be transmitted with the emitted output signal. This embodiment is especially important with respect to another method variant. In this connection, at each location which examines the document produced on the safety paper, for example, at each bank which receives a bank note during its circulation, the examining location and optionally also the date of the examination, representing the information contents, is written into the circuit with the input signal during the checking process, for example, during a money counting process. During the subsequent checking processes, this information contents is transferable by means of the emitted output signal and provides in this way a local and temporal proof of stations which have been passed. Unauthorized money-laundering activities can thus be precisely traced.

With respect to circuit-technological considerations, this is realized especially simply in that the write/read storage is formed by a shift register into which the binary representation of the information contents transmitted by the input signal can be sequentially stored. In this connection, the length of the shift register, as a function of the magnitude of the information contents transmitted by the individual examination locations, determines the total number of storable checking activities. Since the information contents are pushed through from the input of the shift register to its output, the latter always contains the most recent state of these information contents while the information contents of examinations that ate not so recent and surpass the storage capacity of the shift register are moved out of the shift register.

Another important principle of the invention resides in that the structure forming the circuit comprises an energy supply which can be recharged by contactless energy transmission. In this respect, it is especially expedient that the energy transmission is realized by a carrier frequency oscillation provided for modulation with the input signal. By doing so, the energy supply of the circuit can be realized completely from the exterior, and the circuit does not require its own operating energy source; as a result of its limited service life and the fact that, in any case, it can hardly be formed paper-thin with current means, providing such energy source would present great difficulties with regard to a practical and economical realization of the safety paper.

Different possibilities are conceivable in regard to how to manufacture the circuit in or on the safety paper. One of these possibilities provides that the structure forming the circuit is embedded in the paper layer of the safety paper. In this case, the circuit is covered on both sides by partial layers of the paper layer. In contrast, another very expedient alternative is that the pattern which forms the sending/receiving antenna is applied externally to the paper layer and is coupled by the paper layer, which serves as a dielectric, in a capacitive way to the remaining portion of the circuit embedded in the paper layer. This alternative can be produced, for example, in that the remaining part of the circuit is pre-manufactured on a thin flexible substrate and is introduced into the paper layer during the paper manufacture while the antenna pattern is applied, for example, by printing, onto the paper layer provided with the embedded part of the circuit. Between the connecting portions of the pattern, serving as a sending/receiving antenna, arranged on the paper layer and the areas of the embedded flexible substrate serving as connecting portions for the remaining part of the circuit, a part of the paper layer acting as the dielectric is therefore provided, respectively, which, together with the connecting portions, positioned above one another on both sides of this part of the paper layer, of the antenna pattern and of the embedded flexible substrate, forms a capacitor effecting a capacitive coupling.

In a preferred embodiment of the safety paper it is provided that the structure forming the circuit comprises an electronic circuit chip and a pattern connected therewith and serving as a sending/receiving antenna. The conductor pattern forming the sending/receiving antenna allows an effective signal transmission, in particular, when realized by a modulated carrier frequency to which the antenna pattern is tuned. Since the surface area of the circuit is very small in comparison to the format surface of the bank notes and other documents, plenty of space is available for the antenna pattern.

An especially expedient embodiment is realized in that the structure forming the circuit comprises an integrated polymer circuit chip which is formed on a flexible polymer substrate. This embodiment takes advantage of the known modern polymer circuit techniques (compare IEDM 97-331 "Polymeric Integrated Circuits and Light-Emitting Diodes" or The American Association for the Advancement of Science, vol. 278, No. 5337, 17 Oct. 1997, pp. 383–384 "Patterning Electronics on the Cheap").

Preferably, the pattern serving as the sending/receiving antenna has the shape of a dipole antenna.

Because of its simple straight form, the dipole antenna makes possible a simple manufacture of the safety paper. In particular, it can be realized as a straight linear strip across a large paper web, wherein the individual dipole antennas of the documents to be produced from the paper web by cutting are produced automatically by the cutting process. The sending/receiving directional characteristic connected with the dipole antenna is also advantageous. For example, bank notes which are stacked are conventionally counted in counting machines such that the respectively uppermost bank note of the stack is turned about one of its longer lateral edges and is then placed onto a new stack. Inasmuch as the dipole antenna extends perpendicularly to this lateral edge, it passes during this turning process through a plane which extends perpendicularly to the stack plane so that, for a suitable alignment of the sending/receiving characteristic of the counting machine, the coupling for the bank note, aligned during the turning movement perpendicularly to the stack plane, is at a maximum and a feedover of the other bank notes of the stack is suppressed. It is understood that the modulated carrier frequency used for the signal transmission is adjusted to the size of the dipole antenna.

Various possibilities are conceivable in regard to how to realize the circuit chip and its dipole antenna on the safety paper. Preferably, it is suggested that the pattern which forms the dipole antenna is comprised of two conductor strips extending along a common straight line which are contacted via their oppositely positioned ends with connecting areas of the circuit chip. In this connection, it is particularly expedient that the two conductor strips are formed by portions of an insulating thin polymer substrate strip that have been made conducting between whose insulating portion, delimited by the ends of the conductor strips facing one another, the circuit chip is arranged. The conducting portions of the insulating thin polymer substrate strips can be generated, for example, by doping. It is also very expedient to metallize, i.e., to provide with a thin metal layer, a larger polymer web with the exception of the insulating portions serving for receiving the circuit chips and to produce the polymer substrate strips therefrom by cutting. In the case of producing the conductivity by metallization of one side of the polymer substrate strip, the other side can be provided, as an additional measure, with a photovoltaic layer which can serve as an exclusive or additional supplier of operational energy for the circuit. Furthermore, it is expedient to provide the conductor strip with cutouts, in particular, fine perforations, so that the clamping action with the paper layer is improved.

The connection with the circuit chip can be realized in that the circuit chip is formed on a thin-ground semiconductor substrate which is arranged on the insulating portion of the polymer substrate strip. Techniques for thin grinding of the semiconductor substrate are known.

As an alternative, it can be provided that the circuit chip is an integrated polymer circuit chip formed on a flexible polymer substrate provided with a pattern forming the dipole antenna. This embodiment takes advantage of the known modern polymer circuit techniques (compare IEDM 97-331 "Polymeric Integrated Circuits and Light-Emitting Diodes" or The American Association for the Advancement of Science, vol. 278, No. 5337, 17 Oct. 1997, pp. 383–384 "Patterning Electronics on the Cheap").

An embodiment which is advantageous in all situations resides in that the circuit chip and the pattern forming the dipole antenna are embedded in the paper layer of the safety paper. In this case the circuit chip and the dipole antenna are covered on both sides by partial layers of the paper layer.

Another basic principle of the invention resides in that the structure comprises an electro-optical surface area containing the authenticity feature whose light reflection or transmission properties can be controlled as a function of an electrical potential supplied to the surface area. In this case, the authenticity feature can be formed in the surface area, for example, in the form of a document number or bank note number or other identification symbols in positive form or negative form. During the authenticity check the control potential is supplied to this surface area. The thus caused change of the light reflection or transmission then allows optical recognition of the authenticity feature.

As in the afore described embodiments, the required potential for controlling the electro-optical surface area can be generated by contactless introduction of HF energy. An especially advantageous alternative in regard to electrical energy supply, however, resides in that the structure comprises a photovoltaic surface area which serves as an energy supplier. In this case, during the safety check it is only required to supply light onto the photovoltaic surface area of the safety paper. The photovoltaic surface area provides in response to the input light the electrical operating energy for the safety structure. This particularly advantageous kind of energy supply is not limited to safety paper and documents produced therefrom. It is also suitable, in particular, for the contactless energy supply of intelligent hard plastic cards, as known, for example, in the form of smart cards and similar plastic cards with integrated electronic components used, in particular, for payments.

Such electro-optically controlled surface areas can be produced, in particular, by sputtering methods with which, in vacuum or in special gas atmospheres, metals or metal alloys can be applied in thin layers on thin plastic films. The thus coated plastic films, whose coating has been generated during the coating process, or also subsequently thereto, as a pattern that represents the authenticity feature in a positive or negative form, can then be applied onto the safety paper or embedded in its paper layer.

The invention also provides a device for contactless checking of authenticity of a document made of a safety paper which is provided with an electronic circuit chip as well as with a pattern connected therewith and being in the form of a dipole antenna having two dipole branches extending along a common straight line and serving as a sending/receiving antenna, wherein the electronic circuit chip in response to a received input signal emits an output signal representing the authenticity feature, wherein the device has a transport device by which the document to be checked can be transported along a movement path extending transverse to the common straight line of the dipole branches, two conductors extending in the transport direction, one arranged in the area of the movement path of one dipole branch and the other in the area of the movement path of the other dipole branch for a capacitive coupling with the moving dipole branches, respectively, and a sending/receiving device coupled with the two conductors for emitting the input signal for the circuit chip and for receiving its output signal representing the authenticity signal.

In this checking device embodied according to the invention, the two conductors serving as the antenna for the sending/receiving device of the checking device extend over a sufficient length of the movement path of the document to be checked so that over this entire path length a uniformly strong coupling to the dipole antenna of the respective document to be checked is ensured. The dipole antenna of the document to be checked can have a relatively minimal extension in the transport direction while the two conductors of the checking device are comparatively long in comparison thereto.

BRIEF DESCRIPTION OF THE DRAWINGS

In the following description the invention is explained in an exemplary fashion with reference to the drawing. It is shown in.

DETAILED DESCRIPTION OF PREFERRED EMBODIMENTS

Figure 1:
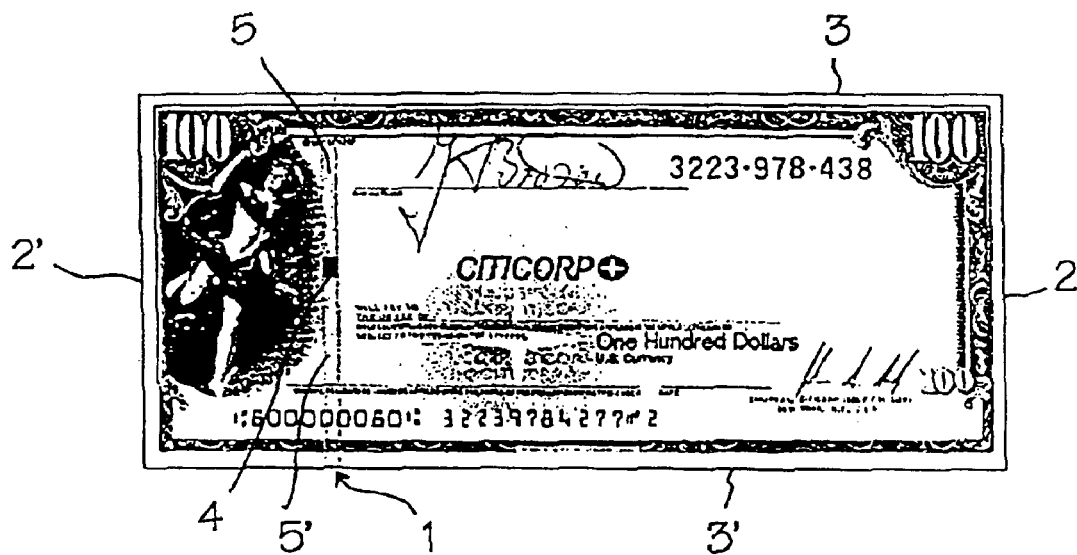
FIG. 1 a plan view onto the front side of a travelers check on which the realization of an electronic circuit which serves for authenticity checking is schematically indicated.

The travelers check of an internationally known bank illustrated in the drawing is supplemented for the purpose of explaining the invention by the schematic illustration of an electronic circuit. The latter has a polymer strip 1 which is made conductive by doping and is embedded in the paper layer. This can be realized in a manner known in the art in that during the paper manufacture first the first partial layer of the paper pulp is deposited, the polymer strip 1 is placed thereon, and, subsequently, a second partial layer of the paper pulp is applied. The polymer strip 1 extends parallel to the two shorter lateral edges 2, 2' over the entire width of the rectangular travelers check up to its longer lateral edges 3, 3'. Even though the polymer strip 1 is covered on both sides by the paper layer, it is illustrated in the drawing so as to show through the layers covering it.

In the center of the polymer strip 1 an integrated polymer circuit chip is formed whose external terminals are formed by the two partial strips 5, 5' of the polymer strip 1 extending on-both sides of the polymer circuit chip 4. The two partial strips 5, 5' are coupled at their ends 6, 6' positioned on the longer lateral edges 3, 3' capacitively or electrically with the antenna pattern 7 which extends, starting at the ends 6, 6', in the form of a conductor along the two longer lateral edges 3, 3' and the shorter lateral edge 2 connecting these two lateral edges.

The antenna pattern 7 could also be embedded during the paper manufacture in the paper layer in that it is generated, for example, by printing it onto the first deposited partial layer of the paper pulp. However, the antenna pattern 7 is printed in a simpler way and without safety loss externally onto the paper layer provided with the embedded polymer strip 1. In this case, the ends of the antenna pattern 7 positioned above the polymer strip 1 overlap the ends 6, 6' of the two partial strips 5, 5' positioned on the longer lateral edges 3, 3' within the paper layer, wherein between the overlapping areas of the antenna pattern 7 and the polymer strip 1 a partial layer of the paper layer is enclosed, respectively. This partial layer thus acts as a dielectric by which the antenna pattern 7 is coupled capacitively with the polymer strip 1 provided with the polymer circuit chip 4.

The polymer circuit chip 4 forms a micro controller with a read-only storage, a shift register serving as a write/read storage, and an input/output unit which comprises a receiving portion and a sending portion. The number as well as the monetary value of the travelers check printed on the front side of the travelers check as optically readable plain text are stored in the read-only storage.

The checking of the authenticity requires the travelers check to be guided through a checking device which reads, on the one hand, the printed, optically readable data such as check number and monetary value. At the same time, this reading device emits a carrier-frequency based, modulated input signal for the circuit 1, 4, 7. This input signal is decoded in the receiving portion of the circuit. In response to this, the micro controller controls the read-only storage and the sending portion for a carrier frequency modulated emission of an output signal in which the information contents of the read-only storage is encoded. The checking device detects this output signal and compares the information contents transmitted therewith with the optically detected plain text data of the travelers check. If no match is detected, the travelers check is identified as forged.

An even higher safety is achieved when the document, for example, the bank note or travelers check, is provided additionally with an authenticity feature, which is not optically readable but readable by other technical means, for example, by UV light or magnetically, at a location which differs from the location of the circuit. In this case, the checking device detects this authenticity feature and transmits the information corresponding to the detected authenticity feature to the circuit. Here, the authenticity feature is checked internally, for example, by comparison with a reference information stored in the circuit. The circuit emits an output signal indicating authenticity to the checking device only in the case of a positive checking result.

The checking location transmits with the input signal an information contents identifying it, for example, the name and place of the bank receiving the travelers check in addition to the date of the checking operation. At the same time, the receiving bank can transmit and store with the input signal identifying information of the person submitting the travelers check, for example, the name and address. This information identifying the person submitting the check is of interest, in particular, when a location which has received the travelers check originally from the issuing person, transfers this travelers check to a third person as legal tender and this third person appears at the bank as the person redeeming the check. This identification information is entered by the micro controller in binary form serially into the shift register wherein, if needed, a portion of previously entered information overflows at the output of the shift register and is lost.

The input signal transmitted from the checking device to the circuit can also be encoded with a command for reading the contents of the shift register with simultaneous re-writing of the read information contents. By transmitting the entire contents of the shift register in the output signal of the circuit, the checking device can detect and process this information contents. In this way, it is possible to determine with the checking device through which checking locations the document to be checked has already passed previously and at what point in time. This is particularly important when the documents are bank notes provided with the circuit 1, 4, 7 which, during the course of their circulation, are counted again and again by the receiving banks. In this way, the circulation path of these bank notes can be monitored.

In the case of travelers checks their safety can be further enhanced in that the drawee bank, when issuing the travelers check, can store an identification code, for example, a pin code, that the check owner has agreed to, in the read/write storage. Inasmuch as the receiving location accepting the travelers check is provided with a suitable device for reading this additional identification code, it can request, for authenticity checking, this additional identification code to be disclosed by the issuer of the check in order to compare it with the read version of the additional identification code. Should no match be present, the travelers check is to be disposed of as forged.

An energy supply, which is integrated in the polymer circuit chip 4 and supplies the operating energy for the circuit 1, 4, 7 provided on the travelers check, is supplied by the carrier frequency oscillation of the input signal transmitted by the checking device. In this way, the checking device transmits the required energy for the operation of the circuit.

It is understood that the employed safety paper for the manufacture of the afore described travelers check is produced in the form of webs which, according to the format, have the polymer strips 1 embedded therein as continuous strips and are provided with the corresponding antenna pattern. This paper web is subsequently printed on both sides and is then cut to size according to the desired format so that the individual pieces of travelers checks or the like are generated.

Figure 3:
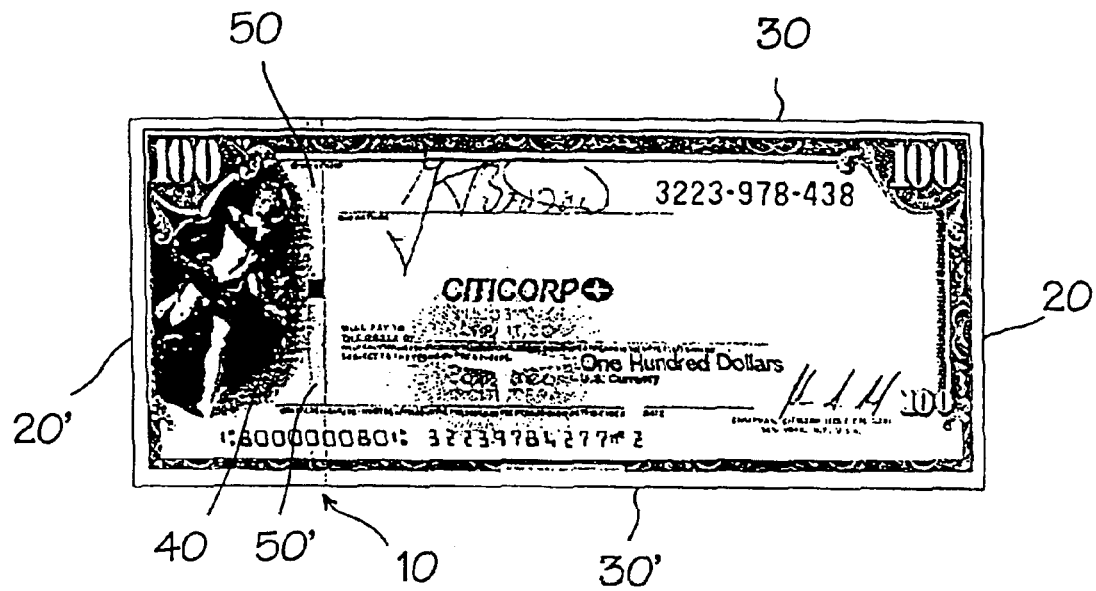
FIG. 3 a view corresponding to FIG. 1 of another embodiment.
Figure 4:
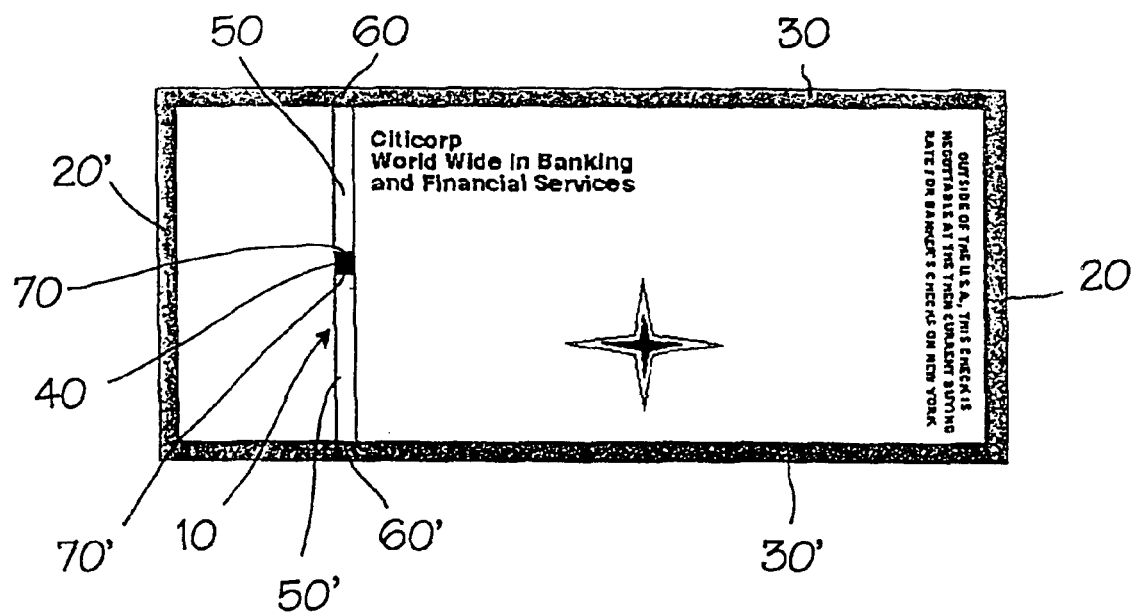
FIG. 4 a plan view onto the backside of the embodiment of FIG. 3.

In the embodiment illustrated in FIGS. 3 and 4, the travelers check has an electronic circuit which is formed by a thin chip 40. The chip 40 is arranged on a polymer strip 10 which is embedded in the paper layer. This can be carried out as is known in the art in that during the paper manufacture first a first partial layer of the paper pulp is deposited, the polymer strip 10 is placed thereon, and subsequently a second partial layer of the paper pulp is applied. The polymer strip 10 extends parallel to the two shorter lateral edges 20, 20' over the entire width of the rectangular travelers check up to its longer lateral edges 30, 30'. Even though the polymer strip 10 is covered on both sides by the paper layer, it is illustrated in the drawing so as to show through the layers covering it.

The polymer strip 10 is, for example, made conductive by doping or by an applied metallization. Only in the center between the two lateral edges 30, 30' where the integrated circuit chip 40 is arranged, the conductive doping or metallization layer is interrupted such that connecting areas of the chip 40 formed on oppositely positioned edges 70, 70' of the chip 40 are contacted by one of the two partial strips 50, 50' of the polymer strip 10 extending on both sides of the interrupted portion, respectively. The two partial strips 50, 50' form in this way a dipole antenna connected to the chip 40 which serves for signal transmission as well as transmission of operating energy for the chip 40.

Figure 2:
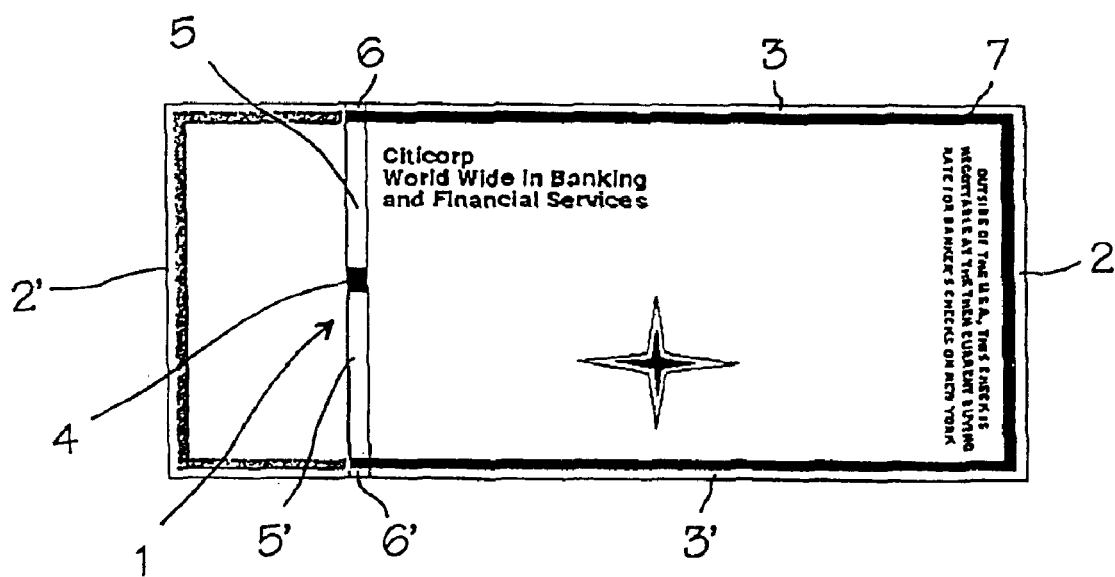
FIG. 2 a view onto the backside of the travelers check illustrated in FIG. 1.

Like the polymer circuit chip 4 of the embodiment of FIGS. 1 and 2, the circuit chip 40 of the embodiment of FIGS. 3 and 4 also forms a micro controller with a read-only storage, a shift register serving as a write/read storage, and an input/output unit comprising a receiving portion and a sending portion. In the read-only storage the number as well as the monetary value of the travelers checks printed on the front side of the travelers check in optically readable plain text are permanently stored. The checking for authenticity is carried out in the same way as explained above for the embodiment of FIGS. 1 and 2.

Bank notes have the same appearance as the travelers check explained in connection with FIGS. 1 and 2. The counting of such bank notes is carried out usually in that from a stack of bank notes to be counted the uppermost bank note, respectively, is turned about one of its longer lateral edges 30 or 30' and is in this way transferred onto a counted stack. During this turning process the conductor strips 50, 50' forming the dipole antenna pass through a plane which is perpendicular to the longer lateral edges 30, 30' so that the conductor strips 50, 50' at the center of this turning movement are positioned perpendicularly to the plane of the bank notes which are positioned on the stack to be counted or on the stack already counted. By using the directional characteristic of the dipole antenna, the checking device can be arranged such that the maximal coupling to the dipole antenna 50, 50' is achieved in the center of the turning path of each bank note between the stack to be counted and the counted stack. Accordingly, feedover of the bank notes positioned on both stacks can be suppressed during the counting process.

As with the embodiment of FIGS. 1 and 2, an energy supply integrated in the circuit chip 40 and providing the operational energy is supplied by the carrier frequency oscillation of the input signal which is transmitted by the checking device. As an alternative or in addition, the operating energy could be derived from a photovoltaic area arranged on the document. In this way, the checking device transmits the required energy for the operation of the circuit chip 40.

The safety paper is produced in the form of webs in which, according to the format of the bank notes, travelers checks, documents etc. to be produced from the safety paper, the polymer strip 10, with the chips 40 arranged thereat at a spacing corresponding to the spacing of the lateral edges 30, 30', is embedded so as to extend continuously. This paper web is subsequently printed on both sides and then cut to size according to the desired format so that the individual pieces of bank notes, travelers check or the like are generated in which the partial strips serving as a dipole antenna extend with their ends 60, 60' to the lateral edges 30, 30' of the cut pieces.

Figure 5:
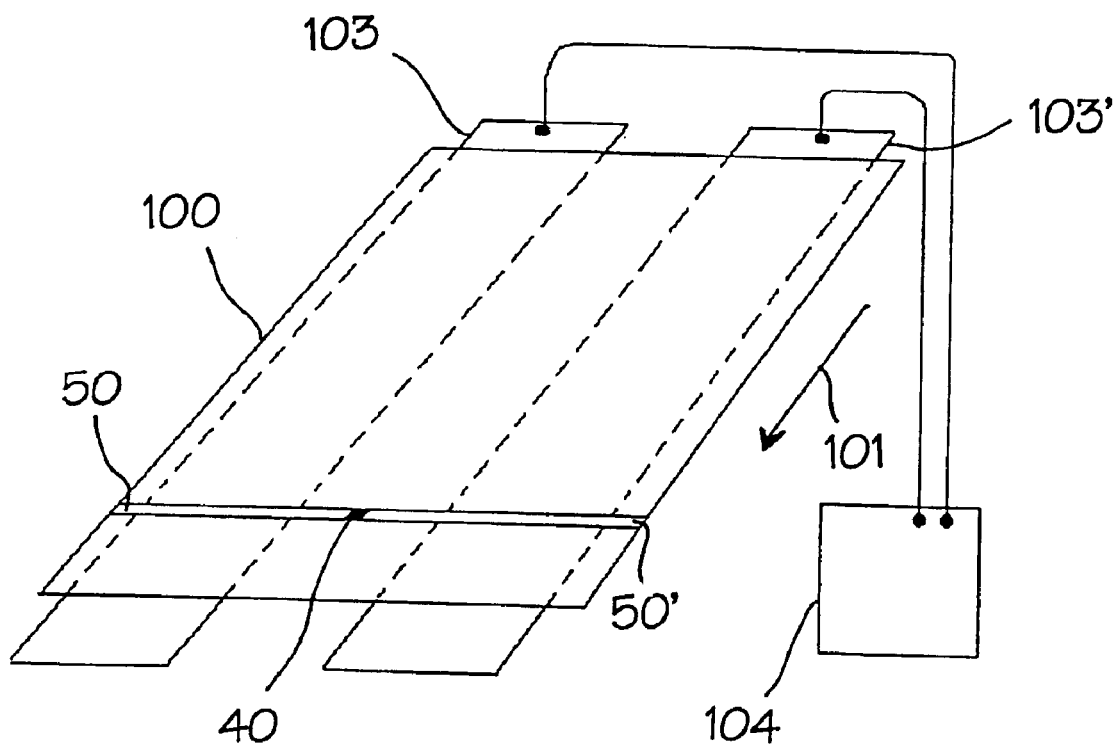
FIG. 5 a schematic illustration of a checking device.

FIG. 5, in which the essential parts of a checking device are schematically illustrated, shows a document 100 to be checked, for example, a bank note, which is transported by a transport device, not represented, in a transport direction illustrated by arrow 101 along a movement path. The document 100 corresponds to the embodiment illustrated in FIGS. 3 and 4. The alignment of the document 100 is such that the two conductor strips 50, 50' connected to the circuit chip 40 and forming the dipole antenna extend transverse to the transport direction 101.

The checking device has two elongate conductors 103, 103' which extend with their longitudinal direction along the transport direction 101 and are arranged such that one conductor 103 is arranged in the area of the movement path of one dipole branch 50 and the other conductor 103' in the area of the movement path of the other dipole branch 50'. In this way, the document 100 during movement through the checking device is coupled capacitively with uniform strength to the two conductor paths 103, 103'. The latter serve as a sending/receiving antenna for a sending/receiving device 104 of the checking device connected thereto. In this way, the input signal for the circuit chip 40 is reliably transmitted from the sending/receiving device 104 of the checking device and the output signal emitted by the circuit chip 40 is reliably received.

Figure 6:
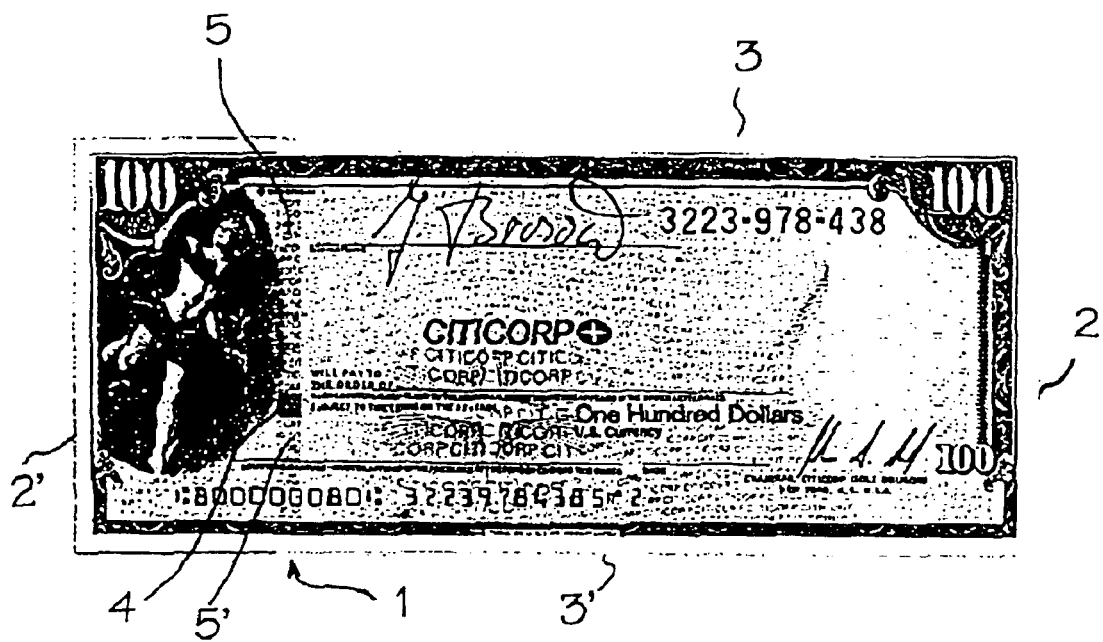
FIG. 6 an embodiment variant of FIG. 1 in a plan view.

The embodiment illustrated in FIG. 6 deviates from that of FIGS. 1 and 2 only with respect to the positional arrangement of the circuit chip 4. Otherwise, there is complete identity with the embodiment of FIGS. 1 and 2, and, therefore, reference is being had to the above description, wherein in FIG. 6 the same reference numerals are used for the parts identical to those of FIG. 1.

FIG. 6 illustrates in deviation of FIG. 1 the asymmetric position of the circuit chip 4 on the document relative to the two transverse edges 2, 2' and the two longitudinal edges 3, 3'. In this way, the circuit chip 4 avoids the area of the longitudinal centerline extending in the center between the two longitudinal edges 3, 3' and parallel thereto and also the area of the transverse centerline of the document extending in the center between the two transverse edges 2, 2' and parallel thereto. Inasmuch as the document, in particular, a bank note, is folded along the two imaginary center lines, the circuit chip 4 is not affected by this folding action. This means that during conventional folding no risk of damage is present. This asymmetric positional arrangement of the circuit chip 4 is advantageous for all embodiments, in particular, also for the arrangement of the circuit chip 40 of the embodiment illustrated in FIGS. 3 and 4.

Often, documents, in particular, bank notes, have an area which is not printed. In this area there is often a watermark in the paper layer. In all embodiments it is advantageous to arrange the circuit chip 4 or 40 in such areas without printed image so that the loading of the circuit chips during the later printing process is avoided.

In all embodiments it is also advantageous that the pattern serving as the sending/receiving antenna is produced of a material whose expansion coefficient substantially matches the expansion coefficient of the paper layer connected to the pattern. Distortions or warping of the safety paper or even detachment of the pattern can thus be prevented.

What is claimed is:

1. A safety paper with a) a structure in the form of an electronic circuit (1, 4, 7) making possible a contactless checking of an authenticity feature, b) the circuit (1, 4, 7) comprising an electronic circuit chip and a pattern (7) connected therewith and serving as a sending/receiving antenna that, c) the electronic circuit, in response to a received input signal, is operative to emit emits an output signal indicating the presence of the authenticity feature, d) the and whose pattern (50, 50') serving as a sending/receiving antenna has the form of being formed as a dipole antenna comprised of two conductor strips (50, 50') extending along a common straight line, e) which at facing ends thereof are contacted with connecting areas (70, 70') of the circuit chip (40), f) the conductor strips and are formed by portions of a thin insulating polymer substrate strip that have been made conductive, between whose g) the circuit chip is positioned on an insulating portion, delimited between the facing ends of the conductor strips (50, 50'), the circuit chip (40) is positioned, wherein h) the circuit chip (40) is formed on a thin-ground semiconductor substrate which is arranged on the insulating portion of the polymer substrate strip.

2. A safety paper with a structure in the form of an electronic circuit (1, 4, 7) making possible a contactless checking of an authenticity feature, the circuit (1, 4, 7) comprising an electronic circuit chip and a pattern (7) connected therewith and serving as a sending/receiving antenna that, in response to a received input signal, emits an output signal indicating the presence of the authenticity feature and whose pattern (50, 50') serving as a sending/receiving antenna has the form of a dipole antenna comprised of two conductor strips (50, 50') extending along a common straight line, which at facing ends thereof are contacted with connecting areas (70, 70') of the circuit chip (40) and are formed by portions of a thin insulating polymer substrate strip that have been made conductive, between whose insulating portion, delimited between the facing ends of the conductor strips (50, 50'), the circuit chip (40) is positioned, wherein the structure forming the circuit (1, 4, 7) comprises an integrated polymer circuit chip (4) formed on a flexible polymer substrate.

3. A safety paper with a structure in the form of an electronic circuit (1, 4, 7) making possible a contactless checking of an authenticity feature, the circuit (1, 4, 7) comprising an electronic circuit chip and a pattern (7) connected therewith and serving as a sending/receiving antenna that, in response to a received input signal, emits an output signal indicating the presence of the authenticity feature, wherein the pattern serving as a sending/receiving antenna is applied externally to the paper layer and is coupled capacitively by the paper layer, acting as a dielectric, to a remaining portion of the circuit embedded in the paper layer.

4. A safety paper according claim 1, wherein a structure forming the circuit (1, 4, 7) comprises a read-only storage set to a predetermined information contents, whose information contents can be transmitted with the emitted output signal.

5. A safety paper according to claim 1, wherein a structure (1, 4, 7) forming the circuit comprises a write/read storage into which information contents transmitted by the received input signal can be written whose information contents can be transmitted with the emitted output signal.

6. A safety paper according to claim 5, wherein the write/read storage is formed by a shift register into which a binary representation of the information contents transmitted with the input signal can be sequentially stored.

7. A safety paper according to claim 1, wherein a structure (1, 4, 7) forming the circuit comprises an energy supply which can be supplied by a contactless energy transmission.

8. A safety paper according to claim 7, wherein energy transmission can be realized by a carrier frequency oscillation provided for modulation with the input signal.

9. A safety paper according to claim 1, wherein a structure forming the circuit (1, 4, 7) is embedded in a paper layer of the safety paper.

10. A safety paper according to claim 1, wherein the pattern (1, 5, 5', 7, 50, 50') serving as a sending/receiving antenna is comprised of a material whose expansion coefficient corresponds substantially to the expansion coefficient of the paper layer.

11. A safety paper according to claim 1, wherein the circuit (1, 4, 7; 40, 50, 50', 70, 70') comprises a micro controller.

12. A document made of a safety paper according to claim 1, wherein the circuit chip (4, 40) is arranged in an area of the document that is not printed.

13. A document made of a safety paper according to claim 1, wherein, in an area which is remote from the area in which the electronic circuit (4, 40) is arranged, an authenticity feature is arranged that is detectable contactless and can be input into the circuit and checked therein.

14. A method for checking the authenticity of documents which are recorded in an optically readable form on a safety paper with a structure in the form of an electronic circuit making possible a contactless checking of an authenticity feature, the circuit, in response to a received input signal, emitting an output signal representing the authenticity feature, comprising transmitting an input signal by the location checking the document to the circuit which triggers the emission of its output signal and the optically readable contents of the document as well as the authenticity feature are automatically detected and correlated with one another, wherein the input signal transmitted by the checking location to the circuit comprises and information contents which identifies the checking location and is stored in the circuit, wherein the stored information contents, which identifies the checking location, can be transmitted with the output signal to a checking location in response to an input signal transmitted subsequently by the checking location.

15. A method according to claim 14, wherein the energy for operating the circuit is transmitted by the checking location with the input signal to the circuit.

16. A device for a contactless checking of authenticity of a document made of a safety paper, the document which is provided with an electronic circuit chip as well as a pattern connected thereto and serving as a sending/receiving antenna, the pattern serving as a sending/receiving antenna is and formed as a dipole antenna with dipole branches extending along a common straight line, wherein the electronic circuit chip, in response to a received input signal, emits is operative to emit an output signal representing the authenticity feature, the device comprising: a transport device by which the documents (100) to be checked are transported along a movement path extending transverse to the common straight line of the dipole branches (50, 50');, two conductors (103, 103') extending in the transport direction (100), one of them arranged in the area of the movement path of the one dipole branch (50) and the other in the area of the movement path of the other dipole branch (50'), respectively, for capacitive coupling with the moving dipole branches (50, 50');, and a sending/receiving device coupled with the conductors (103, 103') for emitting the input signal for the circuit chip (40) and for receiving the output signal representing the authenticity signal.

* * * * *